United States Patent

Lace

[15] 3,661,336

[45] May 9, 1972

[54] MINIATURE CARTRIDGE AND MEANS FOR INSTALLING AND REMOVING THE SAME

[72] Inventor: Melvin A. Lace, Prospect Heights, Ill.

[73] Assignee: Motorola, Inc., Franklin Park, Ill.

[22] Filed: May 1, 1970

[21] Appl. No.: 33,633

[52] U.S. Cl. ..........................242/55.19 A, 242/197, 274/4 C

[51] Int. Cl. ..........................B65h 17/48

[58] Field of Search ....................242/55.19 A, 55.19 R, 194, 242/197, 198, 199, 200, 71.1, 71.2; 274/4 C, 11 C; 352/128, 78; 179/100.22

[56] References Cited

UNITED STATES PATENTS

| | | | |
|---|---|---|---|
| 2,914,620 | 11/1959 | Dale | 242/199 X |
| 3,342,431 | 9/1967 | Mouissie | 242/197 |
| 2,447,389 | 8/1948 | Borchers | 16/114 R |
| 2,364,690 | 12/1944 | Bruner | 16/114 R |
| 2,698,456 | 1/1955 | Duvall | 16/115 |

*Primary Examiner*—Billy S. Taylor
*Attorney*—Mueller & Aichele

[57] ABSTRACT

A miniature tape cartridge for stereo eight-track tape players with a housing of conventional width and height to fit pre-existing tape players, but which is shortened to terminate within a range from between anywhere inwardly of the front wall of the tape player to approximately 1 inch outwardly of the front wall of the tape player, and which has means extensible from the cartridge to facilitate grasping of the cartridge for removal and/or insertion thereof into the tape player.

8 Claims, 7 Drawing Figures

INVENTOR.
MELVIN A. LACE

BY Mueller & Aichele
ATTORNEYS.

INVENTOR.
MELVIN A. LACE
BY Mueller & Aichele
ATTORNEYS.

MINIATURE CARTRIDGE AND MEANS FOR INSTALLING AND REMOVING THE SAME

BACKGROUND OF THE INVENTION

This invention relates generally to cartridges used for containing a quantity of magnetic tape therein and which cartridges are insertable into the entryway of a cartridge type tape player.

Cartridge type tape players have found relatively wide spread use, which is still growing, among automobile owners wherein the tape player has a front wall in which is formed an entryway to receive a tape cartridge. The only requirement for actuating the tape player is for the driver of the automobile to insert the cartridge into the entryway and run it home to a locked in condition. This locked in condition then automatically, in most cases, sets the tape player in operation.

While the cartridge type tape player is particularly advantageous in automotive use, it is now becoming more widely used for home entertainment centers because of the relative simplicity of its operation. In any event, a common problem exists with present tape cartridges whether used in an automobile or in the home, it in that a relatively large amount of space is needed to store the tape cartridges when not in use. This is particularly critical in automotive use where the storage space is usually limited to the glove compartment or other small compartment within the automobile interior.

There are certain limitations on the size requirements of the tape cartridge as heretofore presented. The cartridge not only had to be large enough to house a sufficient quantity of magnetic tape, a pinch roller and transport means within the housing to transport the tape past a magnetic pick-up head, but it also had to be large enough to allow the user thereof to grasp one end of the cartridge and insert it into the entryway of the tape player, and this end remains extended from the front wall of the tape player to permit the user to again grasp the cartridge and retract it from the tape player. The need for this extra length of the cartridge, merely to provide means for the user thereof to grasp the cartridge during insertion and retraction, is one factor which limits the number of cartridges which can be stored in the limited storage space within a motor vehicle. Because of the spring loaded access door covering the entryway of many types of tape players to prevent dirt and dust from getting into such players, the cartridges of the prior art must also be large enough to ensure that the access door will not close behind a cartridge after it is inserted, a condition that would make it very difficult to remove the cartridge.

SUMMARY OF THE INVENTION

Accordingly, it is an object of this invention to provide a miniature tape cartridge for insertion into a cartridge type tape player which is substantially shortened to provide a smaller package for storage, thus enabling storage of a larger number of cartridges, but which cartridge includes extension means to facilitate handling the cartridge during insertion and removal thereof from the tape player.

Another object of this invention is to provide a shortened cartridge which also has means to hold open the access door covering the entryway of the tape player when cartridges are short enough to allow the access door to close after the cartridge has been inserted.

Briefly, the cartridge includes a housing portion of generally the same configurations in height and width as heretofore provided for cartridges of this type, but which is substantially shortened so as to terminate within a range from between anywhere inwardly of the front wall of the tape player and about one inch or so outwardly of the front wall of the tape player. The selection of one inch outwardly of the front wall of the tape player is an arbitrary figure in that it is felt that any further extension would provide a sufficient amount of the cartridge to be grasped by the user thereof.

DESCRIPTION OF THE PREFERRED EMBODIMENTS

Figure 1A:
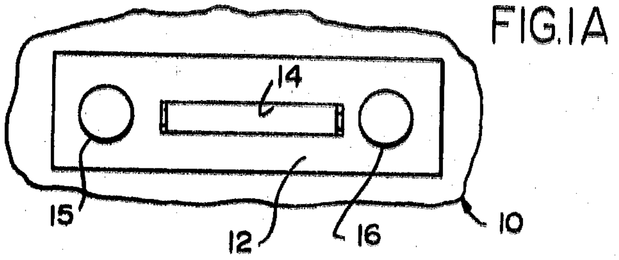
FIG. 1A illustrates a front view of a cartridge type tape player using the cartridges of this invention.
Figure 1B:
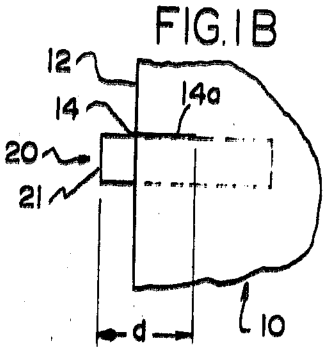
FIG. 1B illustrates a side view of the tape player of FIG. 1A, and indicates a dimension *d* of the range of termination of the cartridge when fully inserted into the tape player.

Referring now to FIGS. 1A and 1B, there is seen fragmentary portions of a cartridge type tape player designated by reference numeral 10. The tape player 10 includes a front wall 12 through which an entryway 14 is formed to receive a tape cartridge of the conventional well-known type as well as the cartridges of this invention. Control knobs 15 and 16 are provided at the front wall of the tape player 10 in the usual manner.

As best seen in FIG. 1B, a tape cartridge in accordance with this invention is shown inserted into the entryway 14 of the front wall 12 and is designated generally by reference numeral 20. The tape cartridge 20 is substantially shorter than the conventional tape cartridges and has the end 21 thereof terminating within the distance *d*, illustrated in FIG. 1B, which is within a range from between anywhere inwardly of the front wall 12 and outwardly thereof approximately 1 inch or so. Cartridges of this dimension are contemplated in the broad aspect of this invention in that they are then provided with extensible means to extend from the terminating end 21 outwardly thereof to facilitate handling of the cartridge during insertion and removal of the cartridge from the entryway 14. Here, an access door **14*a* is shown in a held open condition and will close automatically upon removal of the cartridge 20**.

Figure 2:
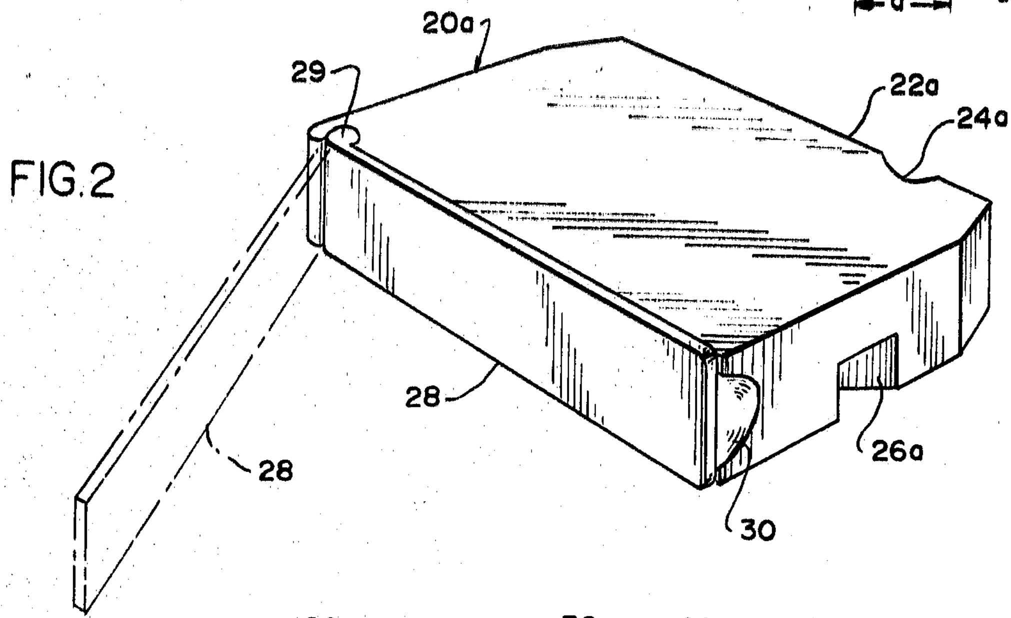
FIG. 2 is a prospective view showing one form of extension means to facilitate handling of the cartridge during insertion and removal thereof.

FIG. 2 illustrates one arrangement whereby the cartridge 20 can be equipped with extensible means. Here the cartridge is designated by reference numeral **20*a* and includes a housing 22*a* which has openings formed in one end thereof. For example, an opening is formed substantially centrally of one end, not shown, to expose a portion of the tape within the housing to a transducer head within the tape player 10 for reproducing the sound tracks on the tape. Another opening 24*a* is provided so that a pressure roller within the housing 22*a* aligns with a capstan drive shaft within the tape player 10 to transport the tape within the housing. A locking notch 26*a* is formed in the housing in the conventional manner to facilitate locking the cartridge home when it is inserted all the way into the entry way 14**.

In accordance with this invention, a pivotal handle 28 is pivoted at one corner of the housing **22*a* to pivot along an axis 29 and swings outwardly of the housing to provide means for grasping the cartridge 20*a*. When the handle 28 is in its fully collapsed condition adjacent the housing 22*a*, this condition occurring during storage or when the cartridge is fully inserted into the tape player 10, a finger detent portion 30 is provided to then facilitate flipping the handle to an extended position to remove the cartridge from the tape player 10**.

Figure 3:
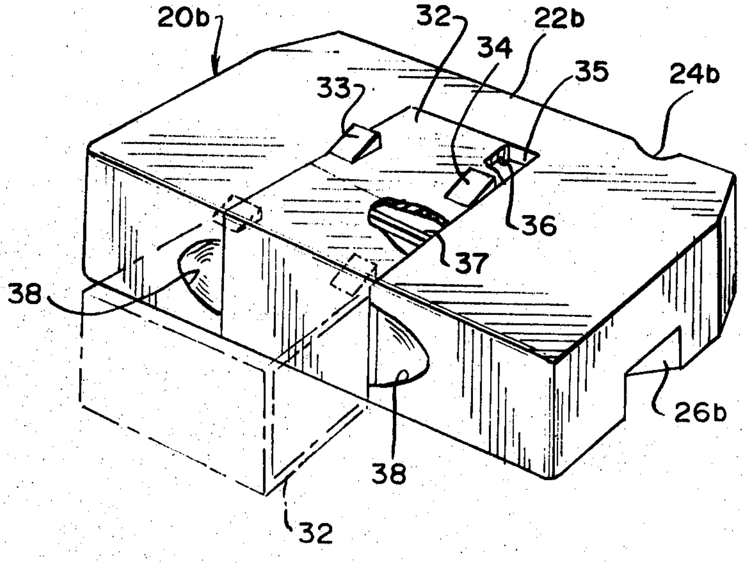
FIG. 3 illustrates an alternate embodiment of extension means formed on the cartridge in accordance with this invention.

FIG. 3 illustrates another form of the invention shown in FIG. 2 in that a U-shaped member 32 embraces three sides of the housing **22*b* including the wall opposite the wall having openings formed therein. The U-shaped member 32 preferably has protuberances 33 and 34 formed thereon, it being understood that one protuberance as well as more than two may be used if desired, and the protuberances may be on the same side or opposite sides of the U-shaped member 32**.

The protuberances abut with the front wall 12 of the player while the cartridge is being inserted into the entryway 14 automatically to extend the U-shaped member 32, as illustrated in broken lines, to form extensible handle means on the cartridge 20. The U-shaped member 32 fits within a channel 35 formed within the housing 20*b* and includes an inwardly turned portion 36 which engages a notched portion 37 within the channel 35 to lock the U-shaped member in its extended position. Finger access depressions 38 are formed on each side of the U-shaped member at the rear thereof to facilitate extracting the member by hand to form a handle therewith, which handle is then used to facilitate inserting the cartridge 20*b* into the entryway 14.

Figure 4:
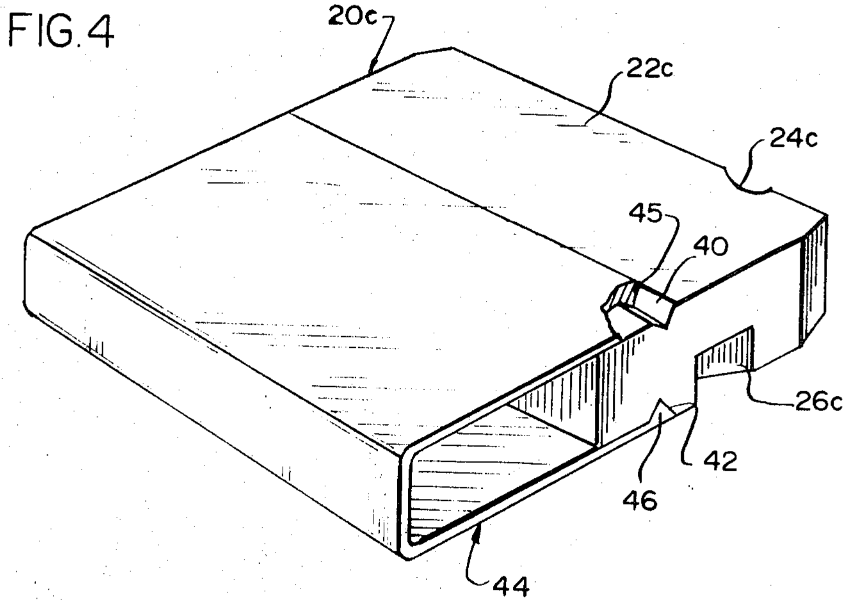
FIG. 4 illustrates means removable from the cartridge so as to be transferred from one cartridge to the next depending on the one being used at the time and inserted into the tape player.

In FIG. 4 the cartridge is designated generally by reference numeral 20*c* and includes a pair of notches 40 and 42 formed on opposite sidewalls of the cartridge preferably diametrically opposed one another. The notches 40 and 42 are here illustrated as extending the entire width of the cartridge 20*c*, it being understood that the notches may be of any extent as desired and, in fact, may be circular or square depressions. A U-shaped removable handle 44 is then fastened to the cartridge 20*c* by snapping the free ends, having inwardly turned portions 45 and 46, into the notches 40 and 42, respectively. This holds the removable handle 44 firmly to the cartridge 20*c* for inserting and removing the same into the entryway 14 of the tape player 10. This arrangement requires only one removalable handle for use with a multitude of cartridges, except of course, in cases where there are more than one tape player being used.

Figure 5:
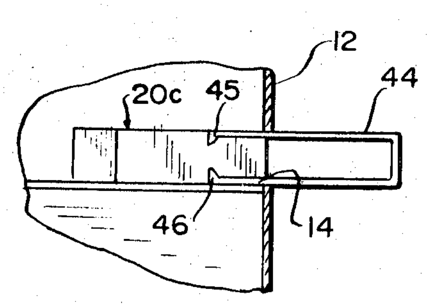
FIG. 5 is a diagrammatic side view illustrating the cartridge and removable handle of FIG. 4.

FIG. 5 illustrates a partial sectional view of the cartridge 20*c* and removable handle 44 inserted into the entryway 14. In this embodiment, the terminating rear wall of the cartridge 20*c* terminates substantially flush with the front wall 12 of the tape player 10, but it will be understood that the removable handle 44 can be used on cartridges having terminating end walls within the range *d*, FIG. 1B, i.e., anywhere inwardly of the front wall 12 and approximately 1 inch outwardly of the front wall 12.

Figure 6:
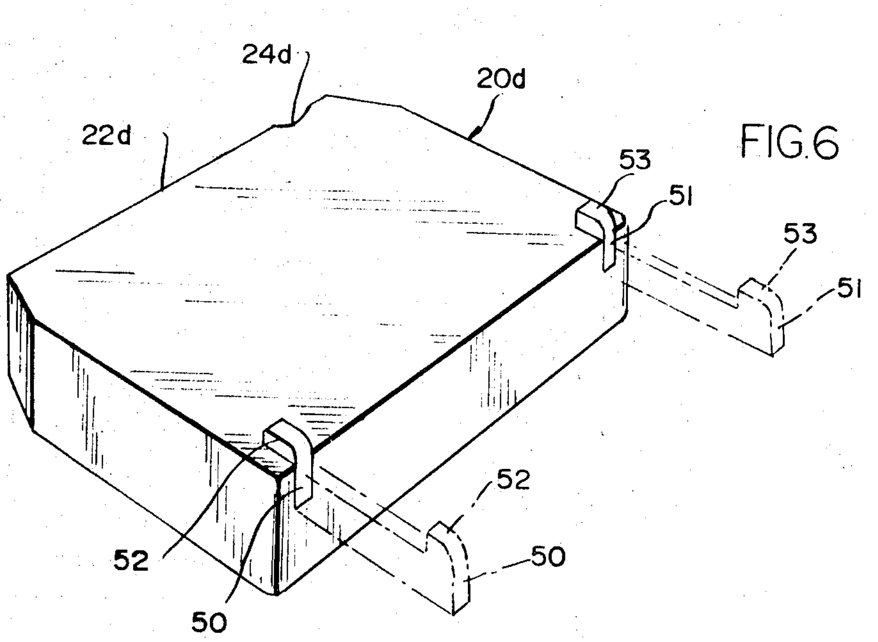
FIG. 6 illustrates yet another form of extensible means formed in the cartridge in accordance with this invention.

FIG. 6 illustrates yet another means for carrying out the concept of this invention. Here a pair of extensible arms 50 and 51 slide inwardly and outwardly of the housing 20*d* and have protuberance portions 52 and 53, respectively, extending therefrom to engage the front wall 12 as the cartridge is inserted into the entryway 14. Upon insertion of the cartridge 20*d*, the protuberances 52 and 53 retract the extensible members 51 and 52, as indicated in broken lines, so they at all times remain at or near the front wall 12 for grasping the same to remove the cartridge from the tape player.

From the foregoing description of the several embodiments of this invention, it will be understood that variations and modifications may be effected without departing from the spirit and scope of the novel concepts disclosed and claimed herein.

I claim:

1. A compact tape cartridge for use with a tape player which has an entryway formed in the front wall to receive the tape cartridge and a spring biased door covering the entryway to prevent undesirable material from entering the tape player and which door is urged open by insertion of the tape cartridge, comprising in combination, a housing defining the cartridge for carrying a quantity of magnetic tape to be transported past an opening formed at the front end of the housing which, in turn, is juxtaposed a transducer head within the tape player, and the opposite end of the housing terminating within the tape player inwardly of the front wall thereof when said housing is fully inserted into playing position in the tape player, and handle means extensible from the rear end of said housing having a first position effectively to lengthen said housing to facilitate insertion and removal of said cartridge and to maintain said door in an open position as long as the tape cartridge is positioned in said entryway, and a second position which renders the cartridge substantially to the size of said housing for storage.

2. The tape cartridge of claim 1 wherein said handle means is pivotally secured at said rear end of said housing to be adjacent said rear end in one condition and to be extended from said rear end in another condition to be grasped by the user for removal of the cartridge from the tape player and to maintain said door open.

3. The tape cartridge of claim 2 wherein said pivotal handle is pivoted on said housing near one corner thereof and collapses against said rear end.

4. The tape cartridge of claim 1 wherein said handle means is a U-shaped member formed about three sides of said housing including said rear end, and said U-shaped member is slidable to a collapsed condition when the cartridge is not inserted into the entryway of the tape player and slidable outwardly to an extended position when the tape cartridge is inserted into the tape player.

5. The tape cartridge of claim 4 further including a protuberance formed on said U-shaped member to abut against a portion of the front wall of the tape player when the cartridge is inserted into the entryway automatically to extend said U-shaped member while inserting the cartridge.

6. The tape cartridge of claim 1 wherein said handle means includes notch means formed in said housing, and a removable handle selectively insertable into said notch means to increase the length of said housing to facilitate removal of the cartridge from the tape player.

7. The tape cartridge of claim 6 wherein said notch means is a pair of elongated notches on opposite sidewalls of said housing diametrically opposed from one another, and wherein said removable handle is U-shaped in configuration having the terminating ends thereof inwardly turned toward one another to engage the elongated notches formed in said housing.

8. The tape cartridge of claim 1 wherein said handle means is formed of an extensible member being collapsed to said rear end of said housing in one condition and extended therefrom when the housing is inserted into the entryway of the tape player, said extensible member including protuberance means for abutting with the front wall of the tape player upon insertion into the entryway thereof to provide means to grasp the cartridge and remove the same from the tape player.

* * * * *